July 7, 1970  F. A. HELM ET AL  3,519,178
AUTOMOTIVE LUGGAGE RACK AIR DEFLECTOR
Filed April 3, 1968  4 Sheets-Sheet 2
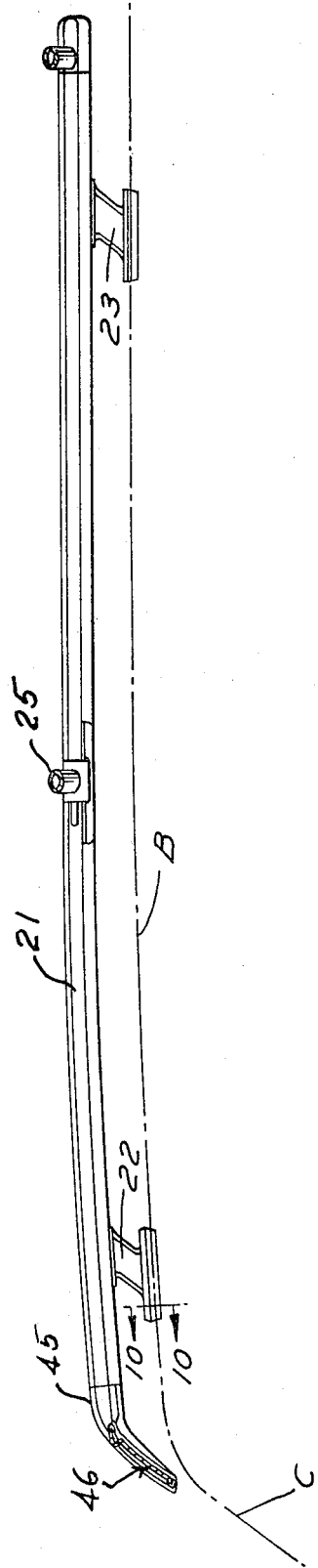
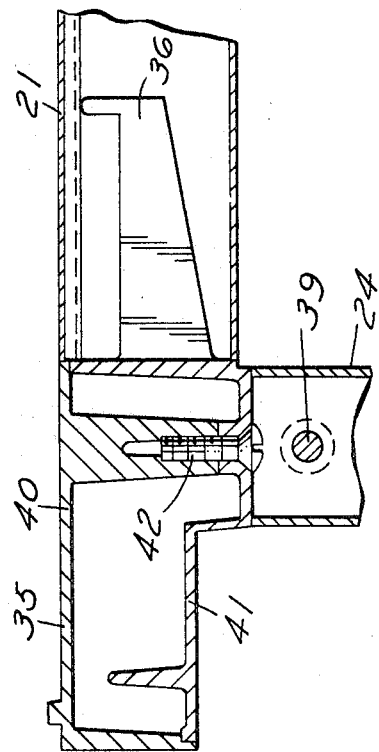
INVENTORS
FREDERICK A. HELM
JAMES STEPHEN
BY
Barnes, Kisselle, Raisch & Choate
ATTORNEYS

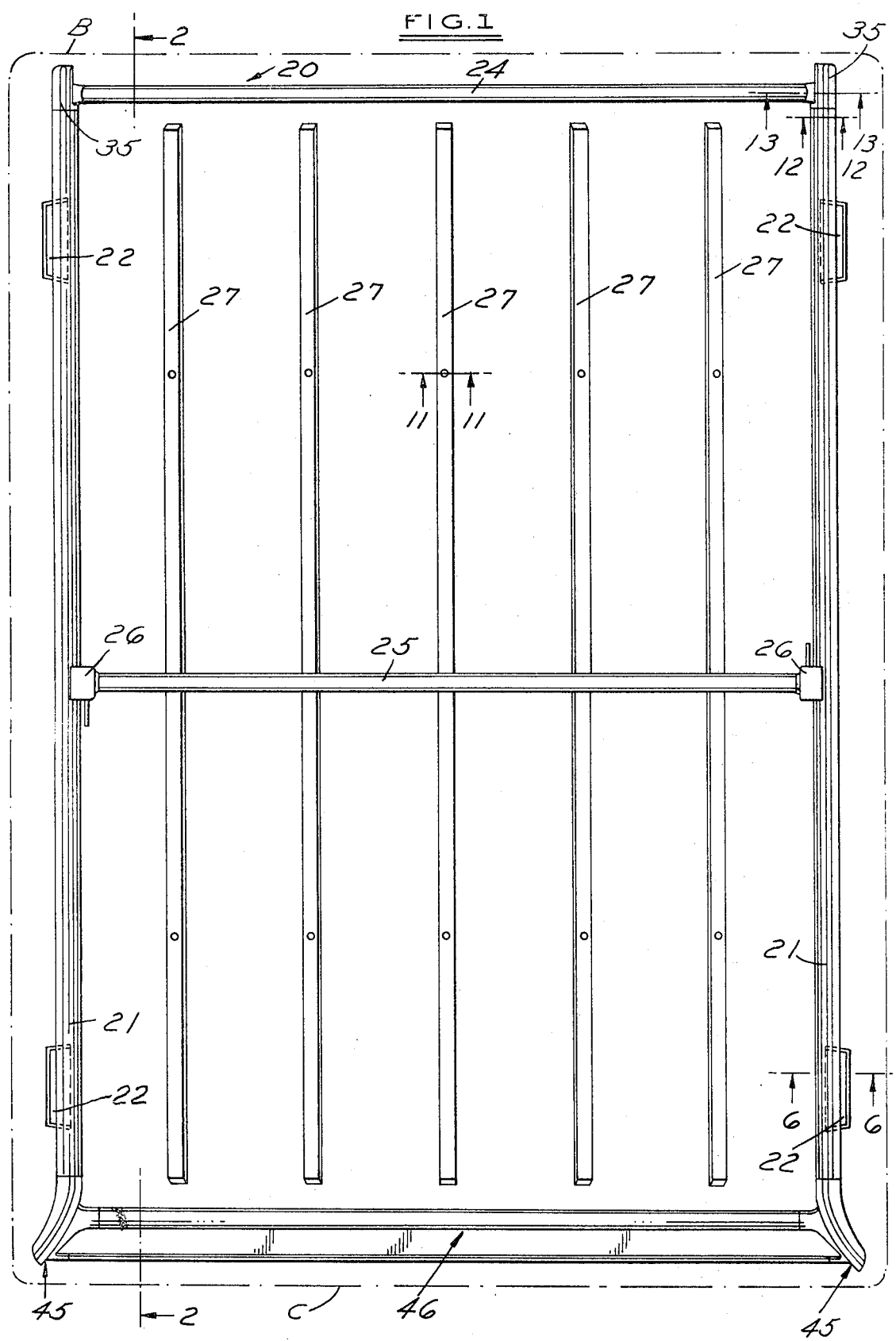

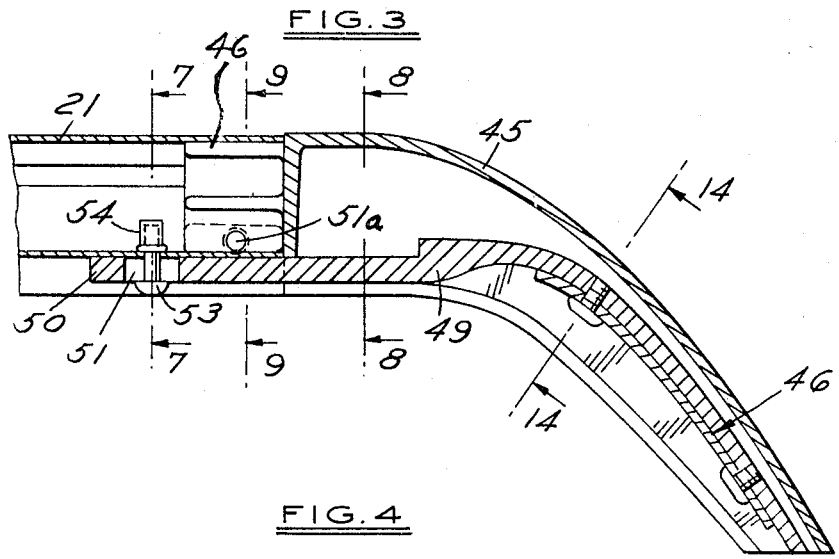
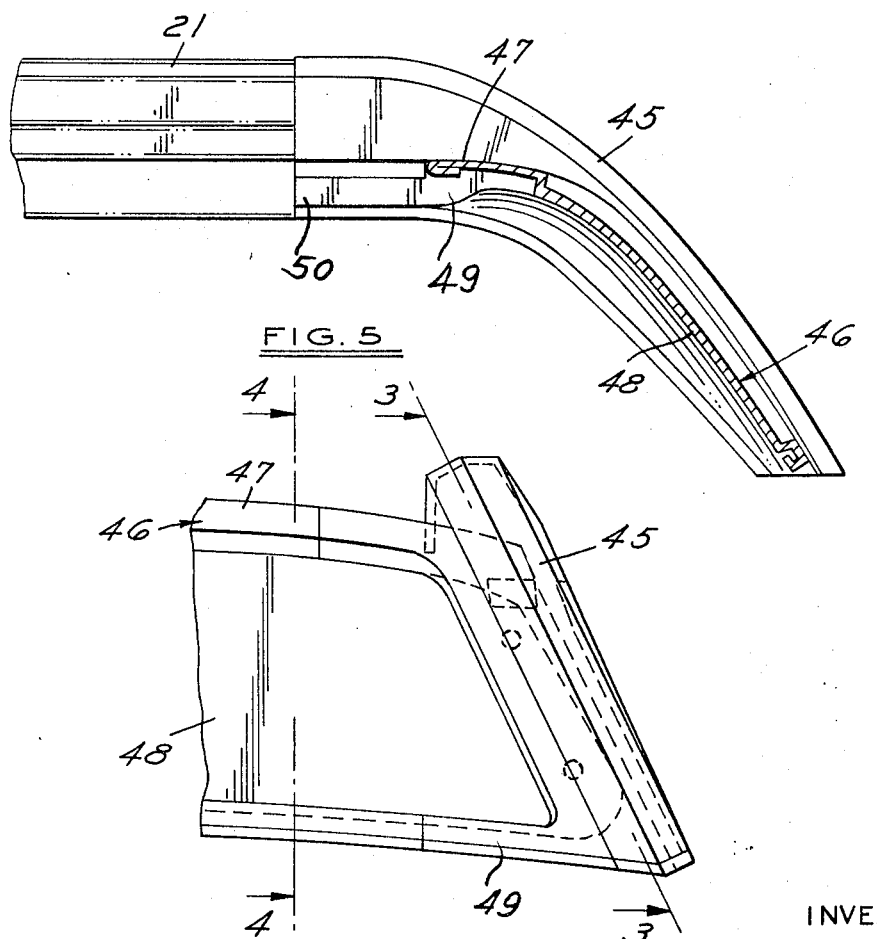

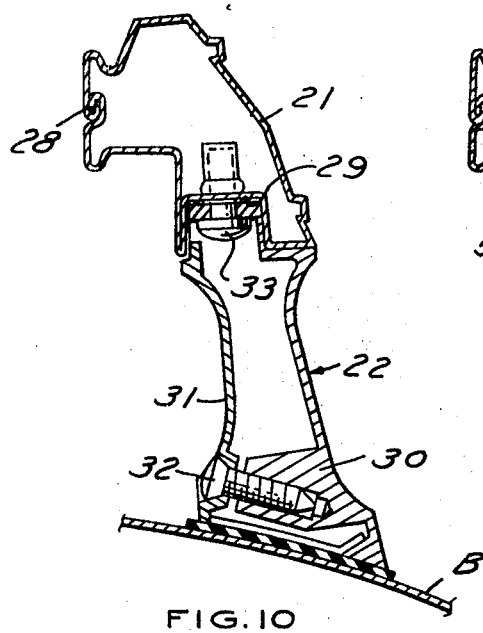
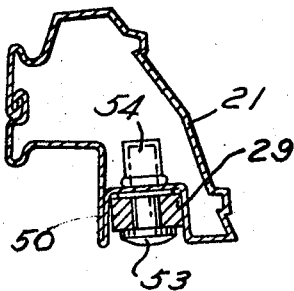
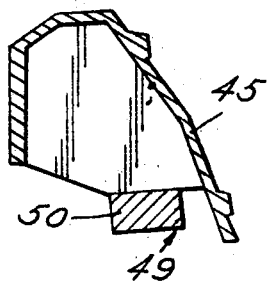
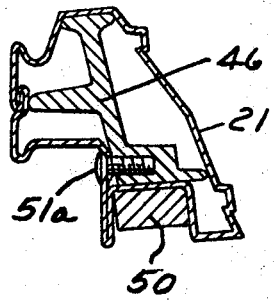
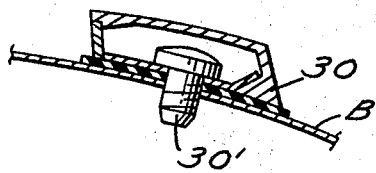
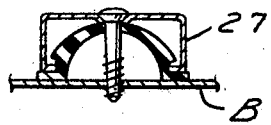
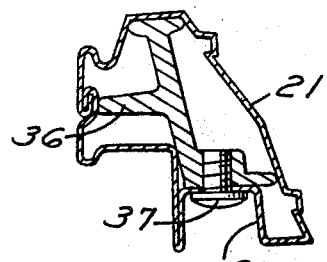
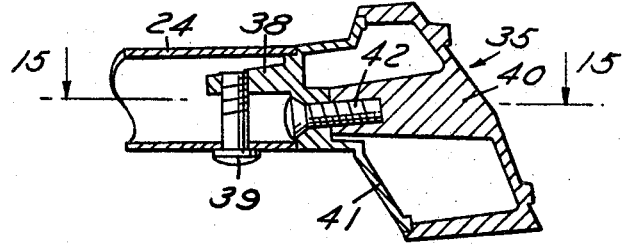
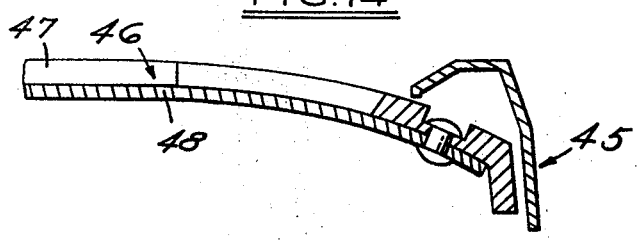

3,519,178
AUTOMOTIVE LUGGAGE RACK AIR DEFLECTOR
Frederick A. Helm, Detroit, and James Stephen, Royal
Oak, Mich., assignors to Helm Design & Manufacturing, Inc., Detroit, Mich., a corporation of Michigan
Filed Apr. 3, 1968, Ser. No. 718,385
Int. Cl. B60r 9/04
U.S. Cl. 224—42.1                                    14 Claims

ABSTRACT OF THE DISCLOSURE

A luggage rack including side rails and cross rails mounted on the top of an automobile of the station wagon type. An air deflector is mounted on the rear of the side rails for movement longitudinally of the side rails to adjust the relative position of the deflector with respect to the automobile body.

This invention relates to luggage racks for automobiles and particularly luggage racks for automobiles having bodies of the station wagon type.

It has long been known that one of the problems with respect to automobile bodies of the station wagon type is that because of the windflow across the top and sides of the body there is a tendency to create a low pressure area on the rear window causing dirt and the like to accumulate thereon. It has also been known that one of the ways of minimizing this tendency is to provide an air or wind deflector which deflects air across the window.

One of the problems in connection with the use of such deflectors is that because of manufacturing tolerances in manufacturing the automobile and the various body parts in mass production, there is a possibility that the deflector will not be accurately positioned with respect to the body so that its full effect will not be realized.

Accordingly among the objects of the present invention are to provide a luggage rack which has a wind deflector that is longitudinally adjustable with respect to the luggage rack and the automobile; which adjustment can be made easily and readily; which is relatively simple; which utilizes a novel deflector design; which is at the same time attractive.

In the drawings:

FIG. 1 is a plan view of a luggage rack embodying the invention.

FIG. 2 is a longitudinal sectional view of the luggage rack taken along line 2—2 of FIG. 1.

FIG. 3 is a fragmentary longitudinal sectional view taken along the line 3—3 in FIG. 5.

FIG. 4 is a fragmentary longitudinal sectional view taken along the line 4—4 in FIG. 5.

FIG. 5 is a fragmentary rear elevational view of the luggage rack shown in FIG. 1.

FIG. 6 is a fragmentary sectional view taken along the line 6—6 in FIG. 1.

FIG. 7 is a fragmentary sectional view taken along the line 7—7 in FIG. 3.

FIG. 8 is a fragmentary sectional view taken along the line 8—8 in FIG. 3.

FIG. 9 is a fragmentary sectional view taken along the line 9—9 in FIG. 3.

FIG. 10 is a fragmentary sectional view taken along the line 10—10 in FIG. 2.

FIG. 11 is a fragmentary sectional view taken along the line 11—11 in FIG. 1.

FIG. 12 is a fragmentary sectional view taken along the line 12—12 in FIG. 1.

FIG. 13 is a fragmentary sectional view taken along the line 13—13 in FIG. 1.

FIG. 14 is a fragmentary sectional view taken along the line 14—14 in FIG. 3.

FIG. 15 is a fragmentary sectional view taken along the line 15—15 in FIG. 13.

Referring to FIGS. 1 and 2, the luggage rack 20 embodying the invention is adapted to be mounted on the top of the automobile B having station wagon type body including a downwardly extending rear wall portion C that normally contains a window. The luggage rack 20 includes longitudinally extending tubular side rails 21 that are supported on the top of the vehicle by stanchions 22. The rack further includes a tubular front cross rail 24, and a tubular cross rail 25 that is slidable along the side rails 21 and locked in position thereon by appropriate locking means 26. The rack further includes a bed or base that comprises longitudinally extending strips 27 that are secured to the top of the automobile body by screws.

Referring to FIG. 6, each side rail 21 is made from formed sheet metal that is joined by a seam 28 and has a generally inverted L-shaped configuration is cross-section including a longitudinally extending downwardly facing bottom channel 29. Each of the stanchions 22 comprises a first section 30 that is fixed to the body B by screws 30' (FIG. 10) and a second section 31 that is fastened to the section 30 by screws 32. As can be seen in FIG. 6, the section 30 of the stanchion includes a portion that extends upwardly into the channel 29 and has openings therein for receiving a rivot 33 for holding the rail 21 on the section 30. The section 31 serves the function of closing the inwardly facing channel of the section 30.

As shown in FIGS. 1 and 12, the rack includes a corner member 35 at the juncture of the front cross rail 24 and each side rail 21. Each corner member 35 includes a rearwardly extending projection 36 that extends into the front of its respective side rail 21. A screw 37 is threaded upwardly through the bottom of the channel 29 in side rail 21 into the projection 36. As shown in FIG .15, each corner member 35 further includes a rearwardly extending projection 38 that extends into the front cross rail 24. A screw 39 extends through an opening in the cross rail 24 and is threaded into the projection 38. As shown in FIGS. 13 and 15, the corner member 35 preferably comprises two sections 40 and 41 that are held in assembled relation by a screw 42.

As shown in FIGS. 1, 3–5, a decorative member 45 is mounted on the rear of each side rail 21 and includes a projection 46 that extends into the interior of each side rail 21. A screw 46a fixes decorative member 45 on side rail 21. The decorative member 45 is generally arcuate in cross section (FIG. 14). A deflector 46 for the wind is mounted on the side rails 21 and extends between the decorative members 45. Specifically, the decorative member has a shape as shown in FIG. 4 which includes a first generally horizontal portion 47 and a second downwardly and rearwardly extending portion 48. Brackets 49 are mounted adjacent side edges of the deflector 46. Each bracket 49 includes an integral bar 50 that extends into the downwardly facing open channel 29 of the side rail 21. Each bar 50 has longitudinally extending slots 51 into which a screw 53 extend for engagement with a nut 54. By loosening the screws 51 the position of the deflector longitudinally of the side rails and in turn of the automobile can be varied.

As shown in FIG. 2 by this arrangement it is possible to accommodate manufacturing tolerances in the automobile so that the deflector 46 can be positioned in accurate relationship to the body and particularly to the rear portion C of the body. In use, when the automobile is moving air flows across the rear portion C, thereby minimizing the tendency for dirt and the like to collect on the rear window which forms a part of the rear portion C.

By utilizing a wind deflector having a cross section as shown in FIG. 4 including substantially horizontal upper edge portion 47, the efficiency of the wind deflector is increased resulting in a more efficient operation.

What is claimed is:

1. In an automobile luggage rack, the combination comprising
spaced longitudinally extending side rails,
means for supporting said side rails on an automobile top,
an air deflector,
means for mounting said air deflector at the rear of said side rails, and
means for selectively adjusting the position of said air deflector longitudinally with respect to said side rails in order to adjust the relative position of said deflector to the automobile upon which the rack is mounted,
each said side rail having a rearwardly extending decorative member,
said deflector having brackets on the side edges thereof disposed substantially within the adjacent decorative members.

2. The combination set forth in claim 1 wherein said means for mounting said deflector on said side rails includes a portion on said deflector extending longitudinally along the side rail,
one of said side rail and said portion having longitudinally extending slots therein, and
fastener means extending through said slots into the other of said side rail and said deflector portion.

3. The combination set forth in claim 2 wherein said slots are on said deflector portion and said fastener means extend into said side rail.

4. The combination set forth in claim 1 wherein said decorative member includes a projection,
said side rail having a hollow portion into which said projection extends.

5. The combination set forth in claim 1 wherein said deflector has a cross section extending longitudinally of the side rails which includes a first substantially horizontal portion extending forwardly and a second portion extending downwardly and rearwardly.

6. The combination set forth in claim 5 wherein said deflector has a front and rear flange extending transversely thereof.

7. In an automobile luggage rack, the combination comprising
spaced longitudinally extending side rails,
means for supporting said side rails on an automobile top,
a rearwardly extending decorative member on each said side rail,
an air deflector,
means for mounting said air deflector on the rear of said side rails between but out of contact with said decorative members,
said air deflector having the side edges thereof disposed substantially within the decorative members, and
means for selectively adjusting the position of said air deflector longitudinally with respect to said side rails in order to adjust the relative position of said deflector to the automobile upon which the rack is mounted.

8. The combination set forth in claim 7 wherein said last-mentioned means comprises interengaging parts between said side rails and said deflector having slidable movement longitudinally relative to said side rails, and means for securing said means together in order to hold said deflector in any longitudinally adjusted position.

9. The combination set forth in claim 8 wherein said last-mentioned means includes fastener means extending through longitudinally extending slots on said deflector means.

10. The combination set forth in claim 7 wherein said means for mounting said deflector on said side rails includes a portion on said deflector extending longitudinally along the side rail,
one of said side rail and said portion having longitudinally extending slots therein, and
fastener means extending through said slots into the other of said side rail and said deflector portion.

11. The combination set forth in claim 10 wherein said slots are on said deflector portion and said fastener means extending into said side rail.

12. The combination set forth in claim 7 wherein said decorative member includes a projection,
said side rail having a hollow portion into which said projection extends.

13. The combination set forth in claim 7 wherein said deflector has a cross section extending longitudinally of the side rails which includes a first substantially horizontal portion extending forwardly and a second portion extending downwardly and rearwardly.

14. The combination set forth in claim 13 wherein said deflector has a front and rear flange extending transversely thereof.

References Cited

UNITED STATES PATENTS

| | | | |
|---|---|---|---|
| Re. 26,538 | 3/1969 | Bott | 224—42.1 |
| 3,000,663 | 8/1961 | Lucchesi | 296—1 |
| 3,097,882 | 7/1963 | Andrews | 296—91 |
| 3,276,811 | 10/1966 | Schmidt | 296—1 |
| 3,427,067 | 2/1969 | Kish | 296—91 XR |

GERALD M. FORLENZA, Primary Examiner

U.S. Cl. X.R.

296—91